United States Patent
Leitner

(10) Patent No.: US 10,116,548 B2
(45) Date of Patent: Oct. 30, 2018

(54) PROTOCOL-BASED PACKET TRAFFIC CREATION

(71) Applicant: Red Hat, Inc., Raleigh, NC (US)

(72) Inventor: Marcelo R. Leitner, Curitiba (BR)

(73) Assignee: Red Hat, Inc., Raleigh, NC (US)

( * ) Notice: Subject to any disclaimer, the term of this patent is extended or adjusted under 35 U.S.C. 154(b) by 49 days.

(21) Appl. No.: 15/248,857

(22) Filed: Aug. 26, 2016

(65) Prior Publication Data

US 2018/0062969 A1    Mar. 1, 2018

(51) Int. Cl.
    *H04L 12/26* (2006.01)
    *H04L 12/24* (2006.01)
    *H04L 29/06* (2006.01)

(52) U.S. Cl.
    CPC .......... *H04L 43/50* (2013.01); *H04L 41/0672* (2013.01); *H04L 43/04* (2013.01); *H04L 43/18* (2013.01); *H04L 69/16* (2013.01)

(58) Field of Classification Search
    CPC combination set(s) only.
    See application file for complete search history.

(56) References Cited

U.S. PATENT DOCUMENTS

| | | | |
|---|---|---|---|
| 6,108,309 A | 8/2000 | Cohoe et al. | |
| 7,254,562 B2 * | 8/2007 | Hsu | G06Q 10/10 705/57 |
| 7,428,664 B2 | 9/2008 | Sirbu | |
| 7,447,209 B2 | 11/2008 | Jeffay et al. | |
| 7,840,664 B2 | 11/2010 | Dugatkin et al. | |
| 7,872,987 B1 | 1/2011 | Hatley et al. | |
| 8,171,553 B2 | 5/2012 | Aziz et al. | |
| 8,547,974 B1 | 10/2013 | Guruswamy et al. | |
| 9,026,853 B2 | 5/2015 | Zemer et al. | |

OTHER PUBLICATIONS

Rungeler et al, Integration of the Packetdrill Testing Tool in INET, Proceeding of the OMNeT++ COmmunity Summit 2015, 5 pages, 2015.*
Cardwell, Neal et al., "Packetdrill: Scriptable Network Stack Testing, from Sockets to Packets," Proceedings of the 2013 USENIX conference on Annual Technical Conference, Jun. 2013, 6 pages.
Geyer, Fabien et al., "RENETO, a realistic network traffic generator for OMNeT++/INET," Proceedings of the 6th International ICST Conference on Simulation Tools and Techniques, Mar. 2013, 9 pages.
Sommers, Joel et al., "Self-Configuring Network Traffic Generation," Proceedings of the 4th ACM SIGCOMM Conference on Internet Measurement, Oct. 25-27, 2004, 14 pages.
Vishwanath, Kashi Venkatesh et al., "Swing: Realistic and Responsive Network Traffic Generation," IEEE/ACM Transactions on Networking, vol. 17, No. 3, Jun. 2003, 14 pages.

* cited by examiner

Primary Examiner — Frank Duong
(74) *Attorney, Agent, or Firm* — Withrow & Terranova, PLLC

(57) ABSTRACT

Mechanisms for packet creation are provided. A packet capture including a plurality of packets is accessed. A first subset of packets is selected from the plurality of packets based on a first computing device ID. Based on a particular protocol layer of a plurality of protocol layers, a protocol layer characteristic of the packets in the first subset of packets is identified. A plurality of instructions is generated that directs a packet generator component to generate a second subset of packets that have the same protocol layer characteristic as the packets in the first subset of packets.

21 Claims, 5 Drawing Sheets

PROTOCOL-BASED PACKET TRAFFIC CREATION

TECHNICAL FIELD

The examples relate generally to reproducing packet traffic to, for example, recreate a problem caused by the packet traffic, and in particular to creating packet traffic that contains the same protocol characteristics of a particular protocol layer at issue.

BACKGROUND

A network stack is a set of technologies that collectively implement a set of network protocol layers that operate in conjunction with one another to process data being received by a computing device or being transmitted by the computing device. Network stacks were developed to facilitate the exchange of data between computing devices.

SUMMARY

The examples access a packet capture of a plurality of packets that were transmitted on a network over a period of time during which a network stack error in a computing device occurred. The examples select, from the plurality of packets, a subset of packets that are associated with the computing device. Based on the subset of packets and a protocol layer of interest, the examples generate instructions that direct a packet generator component to generate and transmit packets that have the same protocol layer characteristics of the protocol layer of the subset of packets.

In one example a method for generating instructions for packet creation is provided. The method includes accessing a packet capture comprising a plurality of packets. The method further includes selecting a first subset of packets from the plurality of packets based on a first computing device identifier (ID). The method further includes identifying, based on a particular protocol layer of a plurality of protocol layers, a protocol layer characteristic of the packets in the first subset of packets, and generating a plurality of instructions that direct a packet generator component to generate a second subset of packets that have the same protocol layer characteristic as the packets in the first subset of packets.

In another example a computing device for generating instructions for packet creation is provided. The computing device includes a memory and a processor device coupled to the memory. The processor device is to access a packet capture comprising a plurality of packets. The processor device is further to select a first subset of packets from the plurality of packets based on a first computing device ID. The processor device is further to identify, based on a particular protocol layer of a plurality of protocol layers, a protocol layer characteristic of packets in the first subset of packets, and generate a plurality of instructions that direct a packet generator component to generate a second subset of packets that have the same protocol layer characteristic as the packets in the first subset of packets.

In another example a computer program product for generating instructions for packet creation is provided. The computer program product is stored on a non-transitory computer-readable storage medium and includes program instructions to cause a processor device to access a packet capture comprising a plurality of packets. The instructions further cause the processor device to select a first subset of packets from the plurality of packets based on a first computing device ID. The instructions further cause the processor device to identify, based on a particular protocol layer of a plurality of protocol layers, a protocol layer characteristic of packets in the first subset of packets, and generate a plurality of instructions that direct a packet generator component to generate a second subset of packets that have the same protocol layer characteristic as the packets in the first subset of packets.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
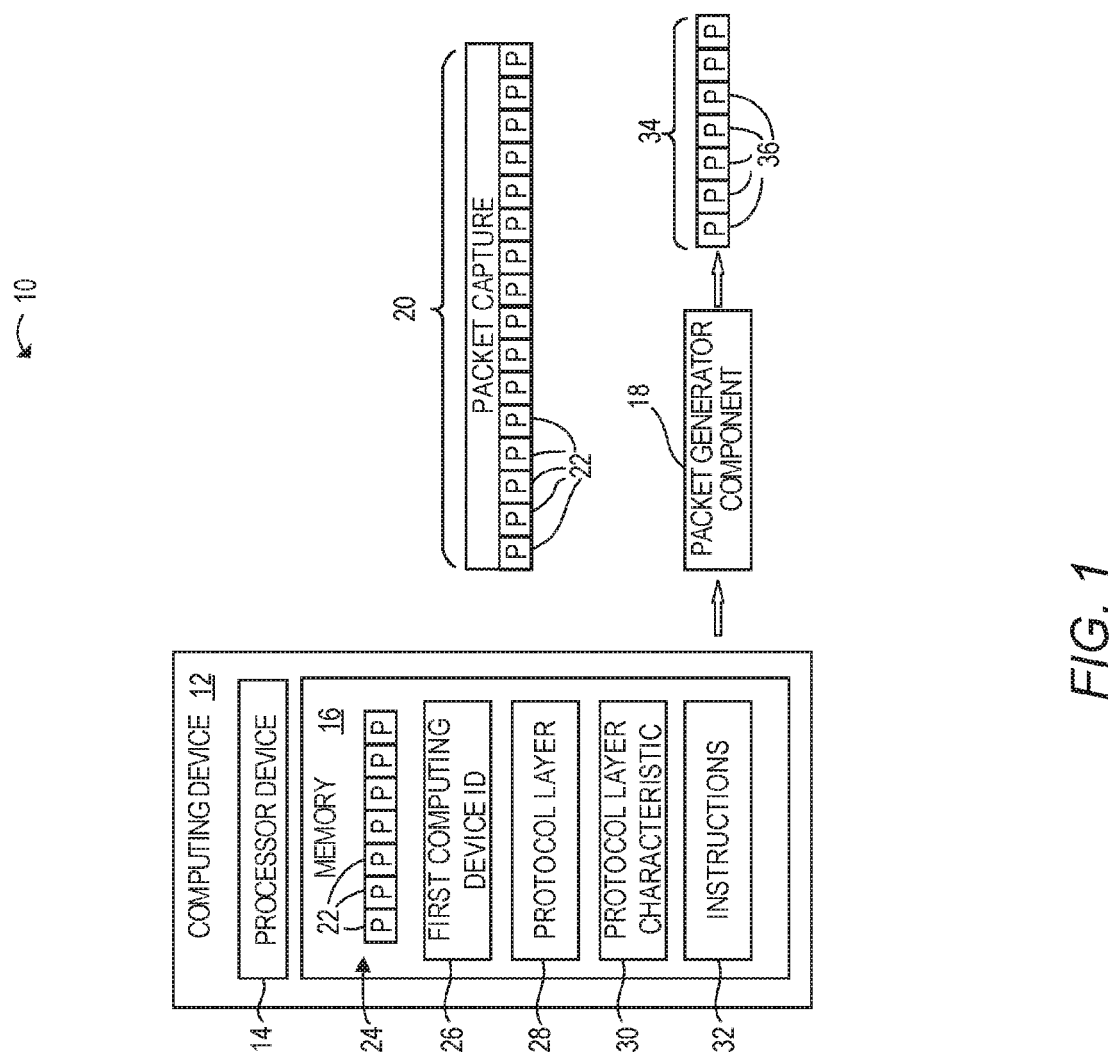
FIG. 1 is a block diagram of an environment in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first subset of packets" and "second subset of packets," and does not imply a priority, a type, an importance, or other attribute, unless otherwise stated herein. As used herein and in the claims, the articles "a" and "an" in reference to an element refers to "one or more" of the element unless otherwise explicitly specified.

A network stack is a set of technologies that collectively implements a set of network protocol layers that operate in conjunction with one another to process data being received by a computing device or being transmitted by the computing device. Network stacks were developed to facilitate the exchange of data between computing devices. When one computing device receives data from another computing device, such as in the form of a packet, the data is first processed by a bottom protocol layer of the network stack. The data may include a payload which comprises the actual data of interest, and one or more headers appended to the payload by the network stack of the sending computing device. The bottom protocol layer of the receiving computing device may process a particular header that corresponds to the bottom protocol layer, and then pass the data to a next protocol layer. This process continues through one or more intermediate protocol layers until the data reaches a top protocol layer. The payload is then provided to a destination component on the receiving computing device, such as a web server, or a database, for processing.

At each respective layer of the network stack, a header associated with the respective layer appended to the payload may be processed, modified, added, and/or removed, depending on whether the data is being received or transmitted and other factors. Network stacks are typically complex technologies and often contain deficiencies, or bugs, that may not arise except in relatively rare circumstances. Moreover, a network stack may process millions and millions of bytes of data each second, and a fault may arise due to a single bit in the millions and millions of bytes. Thus, analyzing such a fault can be very time-consuming, and in some circumstances, the fault may not be able to be diagnosed.

One technique used to analyze a network stack error involves recreating the precise packet traffic that caused the problem. However, a network stack error may occur in a production environment where the data being communicated between computing devices is not public, or is otherwise confidential. In order to diagnose the problem, a manufacturer of the network stack may desire to recreate the stack error using copies of the same packets that caused the stack error in a test environment controlled by the manufacturer. However, copying packets that include such non-public or confidential data from the production environment to the manufacturer's test environment may not be permitted, inhibiting the manufacturer's ability to recreate the stack error and correct the problem.

Recreating packets, rather than copying packets, is not a trivial exercise. While it may be possible in some situations for a human to painstakingly manually generate copies of packets and remove non-public data, it may be necessary to generate hundreds or even thousands of such packets, making such an exercise extremely time-consuming. Moreover, because network protocols assume header information is at precise locations in the packet and has precise values, it is unlikely that a large number of packets could be accurately reproduced without human-introduced errors.

The examples presented herein access a packet capture of a plurality of packets that were transmitted on a network over a period of time during which a network stack error in a computing device occurred. The examples select, from the plurality of packets, a subset of packets that are associated with the computing device. Based on the subset of packets and a protocol layer of interest, the examples generate instructions that direct a packet generator component to generate and transmit packets that have the same protocol layer characteristics of the protocol layer of the subset of packets. The instructions retain payload size but omit payload information and thus cause the recreation of packets that do not contain proprietary or otherwise non-confidential information. Moreover, the examples ensure the protocol characteristics of the protocol layer of interest are retained to ensure the packets generated from the instructions retain identical or substantially similar protocol characteristics compared to the subset of packets used to generate the instructions. The instructions can then be read by a packet generator component which generates new packets that contain the identified protocol characteristics but omit any confidential or non-public information.

FIG. 1 is a block diagram of an environment 10 in which examples may be practiced. The environment 10 includes a computing device 12 that contains a processor device 14 and a memory 16. The environment 10 also includes a packet generator component 18 that may be a separate device from the computing device 12 as illustrated, or, in another example, may be a component that executes on the computing device 12.

Figure 2:
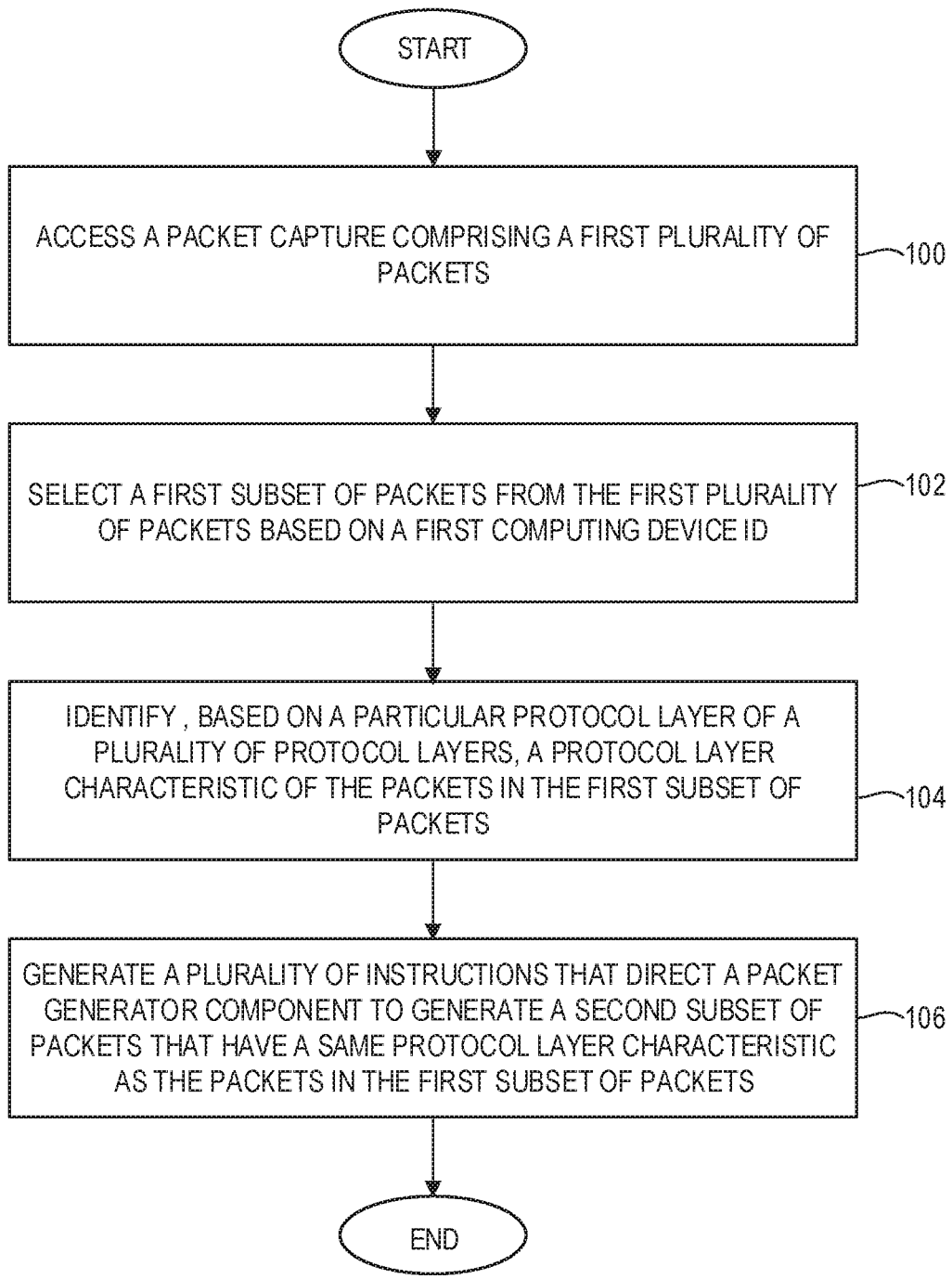
FIG. 2 is a flowchart of a method for generating instructions for packet creation according to one example, and will be discussed in conjunction with FIG. 1.

FIG. 2 is a flowchart of a method for generating instructions for packet creation according to one example, and will be discussed in conjunction with FIG. 1. Solely for purposes of discussion, assume that at a subsequent point in time a network stack of a computing device that was communicating over a network suffered a fault. This computing device will be referred to below as the "affected computing device." For a period of time prior to the fault and subsequent to the fault packets transmitted on the network were stored in a packet capture 20. The packet capture 20 thus comprises a plurality of packets 22 that were transmitted on the network during such period of time. If multiple devices were present on the network, it is likely that the packet capture 20 thus includes packets 22 (only some individually labeled in FIG. 1) that were either sent or received by the affected computing device, as well as packets 22 that were sent or received by other computing devices.

The computing device 12 accesses the packet capture 20 (FIG. 2, block 100). The computing device 12 selects a first subset 24 of packets 22 from the plurality of packets 22 based on a first computing device identifier (ID) (FIG. 2, block 102). The first computing device ID 26 may comprise, for example, an internet protocol address of the affected computing device. The first computing device ID 26 may also include, by way of non-limiting example, a port number associated with the affected computing device. In some examples, the computing device 12 may also select the first subset 24 of packets 22 based on a second computing device ID. In particular, the second computing device ID may identify the computing device with which the affected computing device was communicating at the time of the fault. The computing device 12 uses the first computing device ID 26, and, in some examples, the second computing device ID, to select packets 22 from the packet capture 20 that were either received by the affected computing device or were transmitted by the affected computing device.

The computing device 12 identifies, based on a particular protocol layer 28 of a plurality of protocol layers, one or more protocol layer characteristics 30 of the packets 22 in the first subset 24 (FIG. 2, block 104). Examples of the particular protocol layer 28 include, by way of non-limiting example, a transmission control protocol (TCP) layer, an internet protocol (IP) layer, a hypertext transport protocol (HTTP) layer, a user datagram protocol (UDP), and the like. Examples of the protocol layer characteristic 30 may differ depending on the particular protocol layer 28, but, by way of example, for a TCP layer, the protocol layer characteristic 30 may comprise one or more of a window scaling factor, a window size, TCP flags such as a push (PSH) flag, a synchronize (SYN) flag, an acknowledgment (ACK) flag, a finished (FIN) flag, an explicit congestion notification (ECN) flag, a congestion window reduced (CWR) flag, an urgent (URG) flag, a reset (RST) flag, and the like, sequence and ACK numbers, an urgent pointer and packet sizes, and frame timing and/or inter-packet timing.

The computing device 12 generates a plurality of instructions 32 that direct the packet generator component 18 to generate a second subset 34 of packets 36 that have a same protocol layer characteristic 30 as the packets 22 in the first subset 24 of packets 22 (FIG. 2, block 106). The plurality of instructions 32 omits the payload contained in the packets 22 of the first subset 24 of packets 22 but may instruct the packet generator component 18 to generate packets 36 that contain a payload of the same size as corresponding packets 22. Thus, the packets 36 contain the same protocol layer characteristic 30, and may comprise the same size payloads as corresponding packets 22, but omit any non-public or proprietary data that may be contained in the packets 22.

Figure 3:
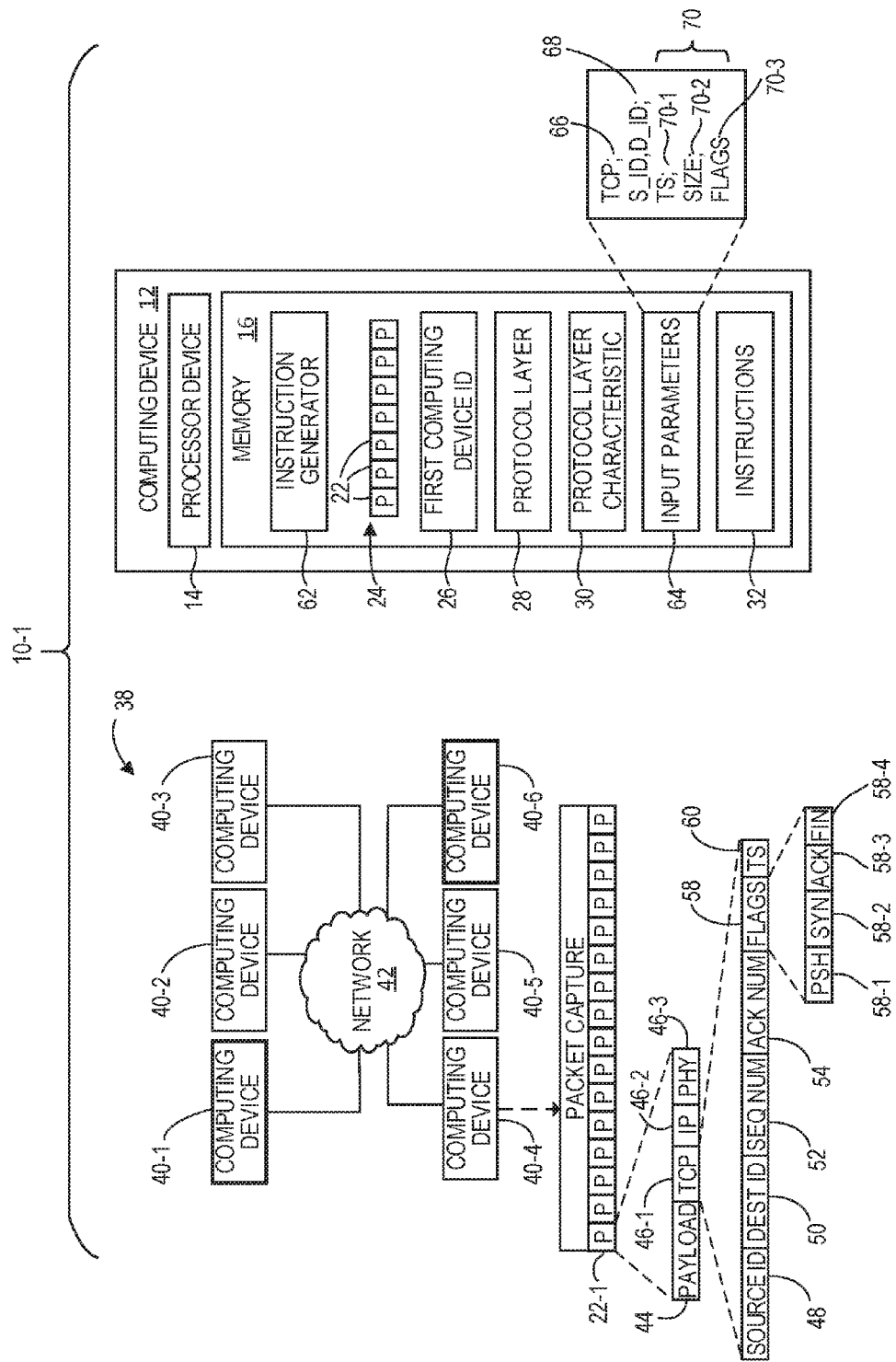
FIG. 3 is a block diagram of another environment according to one example.

FIG. 3 is a block diagram of an environment 10-1 according to one example. The environment 10-1 is substantially similar to the environment 10 except as otherwise discussed herein. The environment 10-1 includes a production environment 38 in which a plurality of computing devices 40-1-40-6 (generally, computing devices 40) are communicating over a network 42. The computing device 40-4 monitors the network 42, intercepts packets communicated over the network 42, and stores such packets in the packet capture 20. A packet 22-1 is illustrated in exploded detail to illustrate aspects of the packets 22 generally. The packet 22-1 includes, in this example, a payload 44, and three protocol layers. In particular, the packet 22-1 includes a TCP protocol layer 46-1, a IP protocol layer 46-2, and a physical protocol layer 46-3 (generally, protocol layers 46). The protocol layers 46 are used by network stacks in the computing devices 40 to communicate data between the computing devices 40. The payload 44 comprises data generated by a computing device 40 that is to be communicated to another computing device 40 for processing by some component other than the network stack. Not every packet 22 contains the payload 44. The size of the payload 44 may differ in each packet 22.

The TCP protocol layer 46-1 contains a plurality of data fields, such as a source ID field 48 that identifies the computing device 40 from which the packet 22-1 is sent, and a destination ID field 50 that identifies the computing device 40 to which the packet 22-1 is to be delivered. The source ID field 48 and the destination ID field 50 may comprise, for example, IP addresses, and/or port numbers. The TCP protocol layer 46-1 also includes a sequence number field 52 that may identify a sequence number associated with the packet 22-1, and an acknowledgment number field 54 that may identify an acknowledgment number. The TCP protocol layer 46-1 includes a plurality of flag fields 58-1-58-4 (generally flag fields 58), including, by way of non-limiting example, a PSH flag field 58-1, a SYN flag field 58-2, an ACK flag field 58-3, and a FIN flag field 58-4. Other such flags may include, by way of non-limiting example, an ECN flag, a CWR flag, an URG flag, and an RST flag. One or more of the flag fields 58 may be set to a value of true in certain of the packets 22. The TCP protocol layer 46-1 may also include a timestamp (TS) field 60 that identifies a time at which the packet 22-1 was sent by the sending computing device 40.

For purposes of illustration assume that during the period of time that the computing device 40-4 was storing the packets 22 in the packet capture 20, the computing device 40-1 and the computing device 40-6 were exchanging packets between one another and that the network stack contained in the computing device 40-1 suffered a fault during such exchange of packets.

In one example, the computing device 12 includes an instruction generator 62 that implements all, or a portion of, the functionality disclosed herein. The instruction generator 62 may comprise circuitry, software instructions that execute in conjunction with the processor device 14, or a combination of both circuitry and software instructions.

Because the instruction generator 62 is a component of the computing device 12, functionality implemented by the instruction generator 62 may be attributed to the computing device 12 generally. Moreover, in examples where the instruction generator 62 comprises software instructions that program the processor device 14 to carry out functionality discussed herein, functionality implemented by the instruction generator 62 may be attributed herein to the processor device 14.

For purposes of illustration, assume that the instruction generator 62 is initiated and provided certain input parameters 64. The input parameters 64 may include, by way of non-limiting example, a designated protocol layer of interest 66, which in this example identifies the TCP protocol layer. The instruction generator 62 stores the designated protocol layer of interest 66 as the protocol layer 28 in the memory 16. The input parameters 64 may also include information 68 that identifies both the computing devices 40-1 and 40-6. For example, the information 68 may comprise IP addresses of the computing devices 40-1, 40-6. The information 68 may also include port numbers of the computing devices 40-1, 40-6. The information 68 may also identify the computing device 40-1 as the affected computing device that includes the network stack that encountered the fault. The instruction generator 62 may store all or a portion of such information as the first computing device ID 26 in the memory 16.

The input parameters 64 may also include protocol layer characteristic information 70 that identify protocol layer characteristics of the packets 22 that are to be maintained in packets that are recreated via the instructions 32. For example, a protocol layer characteristic information 70-1 ("TS") may indicate that packet timing is to be retained. The packet timing characteristic relates to inter-packet timing of the packets 22. Thus, the recreated packets are to be sent with the same inter-packet timing as the packets 22 were sent by the corresponding computing devices 40-1, 40-6. For example, if the computing device 40-1 sent a first packet 22 at a first time, and a successive packet 456 milliseconds later, then the recreated packets that correspond to such packets should also be sent 456 milliseconds apart from one another.

A protocol layer characteristic information 70-2 ("SIZE") may indicate that the payload size of any packets 22 is to be retained. The payload size refers to a size of a payload, if any, in any of the packets 22. A protocol layer characteristic information 70-3 ("FLAGS") indicates that the value of the flag fields 58 should be retained in the recreated packets.

Based on the input parameters 64 and the packet capture 20, the instruction generator 62 generates the plurality of instructions 32 that direct the packet generator component 18 to generate the second subset 34 of packets 36 that have the same protocol layer characteristics 30 designated in the input parameters 64 as the packets 22 in the first subset 24 of packets 22.

Figure 4:
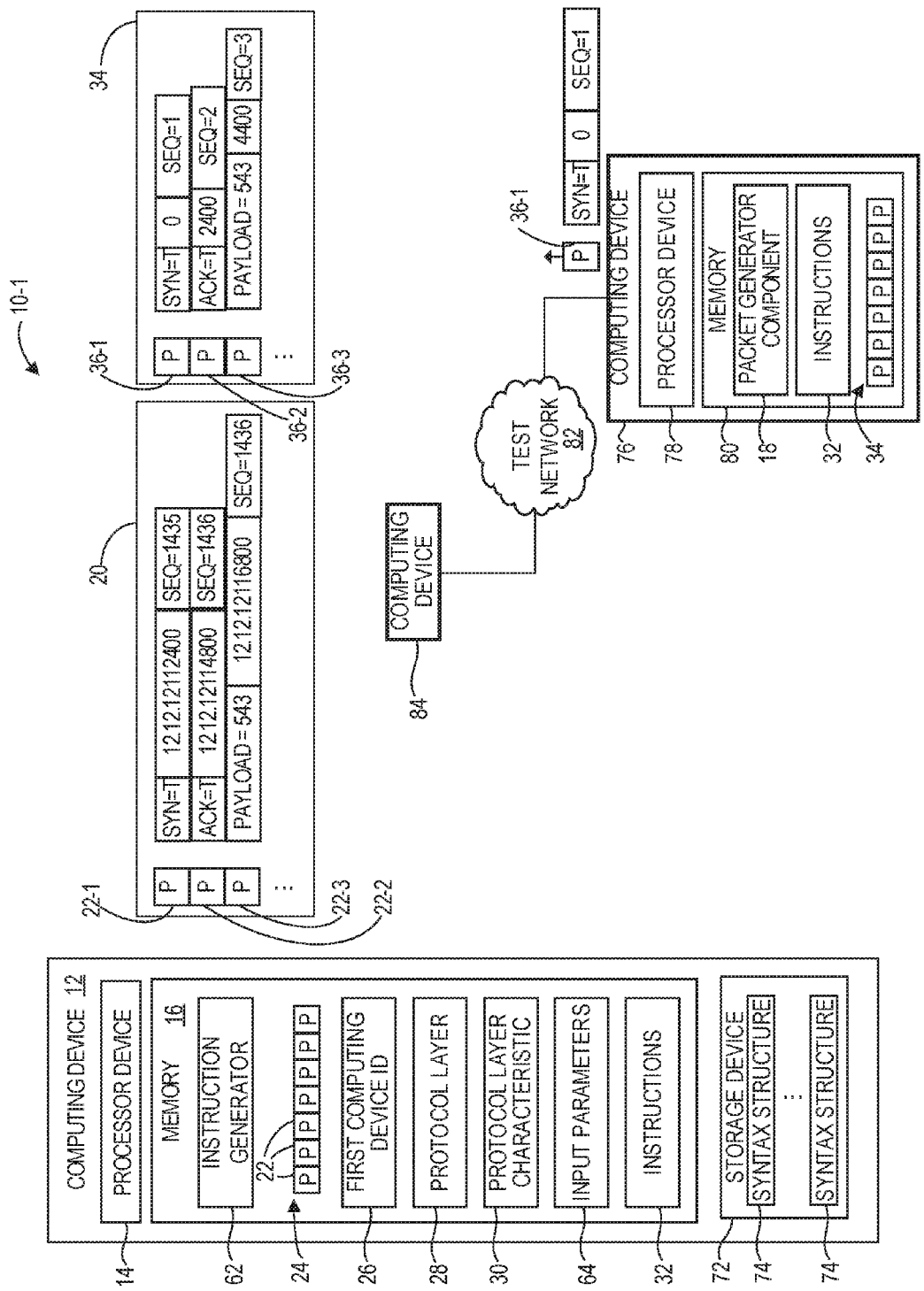
FIG. 4 is a block diagram of an environment suitable for illustrating the generation of instructions according to one example.

FIG. 4 is a block diagram of the environment 10-1 suitable for illustrating the generation of the instructions 32 according to one example. The computing device 12 includes a storage device 72. One or more syntax structures 74 may be stored in the storage device 72. Each syntax structure 74 may identify an instruction syntax for a particular packet generator component 18. Based on the input parameters 64, the instruction generator 62 may select a particular syntax structure 74 and generate the instructions 32 in accordance with the syntax structure 74. As discussed above, the input parameters 64 may also identify which computing device is being tested. For example, the input parameters 64 may identify the computing device 40-1 as the affected computing device that includes the network stack that encountered the fault. The instruction generator 62 may use this information to generate instructions to test one computing device by messages generated and sent by another computing device.

As an example of such instruction generation where the protocol layer of interest is the TCP layer, the instruction generator 62 may select a syntax structure 74 that identifies a syntax for instructions for a particular packet generator component 18 that is configured to generate packets having protocol layer characteristics associated with the TCP layer. If the protocol layer of interest were, for example, the HTTP protocol layer, the instruction generator 62 may select a different syntax structure 74 that identifies a syntax structure for a packet generator component 18 configured to generate packets having an HTTP layer with the same HTTP protocol layer characteristics as the packets 22.

The syntax structure 74 identifies the set of rules that defines the combinations of symbols that are a correctly structured statement for the respective packet generator component 18. While the examples are not limited to any particular packet generator component 18, in one example, where the protocol layer of interest is the TCP layer, the packet generator component 18 may comprise the Packetdrill packet generator component 18, available to the public on the online project hosting website Github. In this example, the instruction generator 62 would access a syntax structure 74 that identifies the instruction syntax for Packetdrill, and the instruction generator 62 generates the instructions 32 in accordance with the instruction syntax for Packetdrill.

To illustrate the generation of instructions, assume that the instruction generator 62 accesses a first packet 22-1 from the subset of packets 22. The instruction generator 62 generates instructions, in accordance with the appropriate syntax structure 74, to generate a corresponding packet 36-1 in the second subset 34 of packets 36. In this example, the packet 22-1 has the SYN flag set to true, was sent at a time 12.12.12112400, and has a sequence number of 1435. The time that the packet 22-1 was sent may come from the TS field 60, or, when the packet capture 20 was generated, the computing device 40-4 may have recorded to the packet capture 20 a transmission timestamp in conjunction with each packet 22 that identifies a time of transmission of the packet 22.

Upon reading the instructions, the packet generator component 18 may generate the packet 36-1 which has the SYN flag set to true, and may, in one example, use relative sequence numbers as opposed to the actual sequence numbers from the corresponding packet 22-1. Because the packet 22-1 containing the SYN flag value of true may indicate that this was the first packet 22 of the sequence of packets that ultimately resulted in the network stack error, the packet 36-1 may be given a sequence number of 1.

The instruction generator 62 may next access the packet 22-2 and generate instructions in accordance with the appropriate syntax structure 74 to generate a corresponding packet 36-2 in the second subset 34 of packets 36. In this example, the packet 22-2 has the ACK flag set to true, was sent at a time 12.12.12114800, and had a sequence number of 1436. Upon reading the instructions, the packet generator component 18 may generate the corresponding packet 36-2 which has the ACK flag set to true and a sequence number of 2. The instructions may also direct the packet generator component 18 to send the packet 36-2 2400 milliseconds after the packet 36-1 to maintain the same inter-packet timing as that between the packet 22-1 and the packet 22-2.

The instruction generator 62 may next access the packet 22-3 and generate instructions in accordance with the appropriate syntax structure 74 to generate a corresponding packet 36-3 in the second subset 34 of packets 36. The packet 22-3 contains a 543 byte payload that was sent at a time 12.12.12116800, and has a sequence number of 1437. The instruction generator 62 generates instructions to generate the corresponding packet 36-3 that contains a 543 byte payload, but does not provide the actual data from the payload in the instructions. Thus, when the packet generator component 18 generates the packet 36-3, the packet 36-3 will contain a 543 byte payload but will not contain the actual data from the corresponding packet 22-3.

While certain packets 22 and the contents thereof have been illustrated for purposes of discussion, it will be appreciated that the precise content of the packets 22 in a real-life packet flow would likely differ, contain different information, and may be sent in a different sequence. Thus, the packets 22 illustrated here are not intended to precisely identify a real environment and are provided solely for purposes of explanation and illustration.

In one example, the packet generator component 18 executes on a computing device 76 that contains a processor device 78 and a memory 80. The computing device 76 is coupled to a test network 82. A computing device 84 may also be coupled to the test network 82. In operation, the packet generator component 18 accesses the instructions 32. In one example, the packet generator component 18 may access the instructions 32 in response to a message or direction from the instruction generator 62. The packet generator component 18 reads the instructions for generating the packet 36-1. The packet generator uses computing device identifiers associated with the computing device 76 and the computing device 84 rather than the computing devices 40-1 and 40-6. The packet generator component 18 then sends the packet 36-1 to the computing device 84 via the test network 82. The packet generator component 18 then generates the packet 36-2 and sends the packet 36-2 at the appropriate time to maintain the same inter-packet timing as the inter-packet timing between the packets 22-1 and 22-2. As discussed above, for packets 36 that contain a payload, the packet generator component 18 will generate the appropriate sized payload, but the payload may comprise null information instead of data from the corresponding packets 22, and thus no non-public or otherwise confidential information is used.

This process continues and preferably the network stack of the computing device 76 faults in the same manner as the network stack of the computing device 40-1. Because the network stack error can be reproduced, the manufacturer of the network stack can determine the reason for the error, and modify the network stack to eliminate the error.

Figure 5:
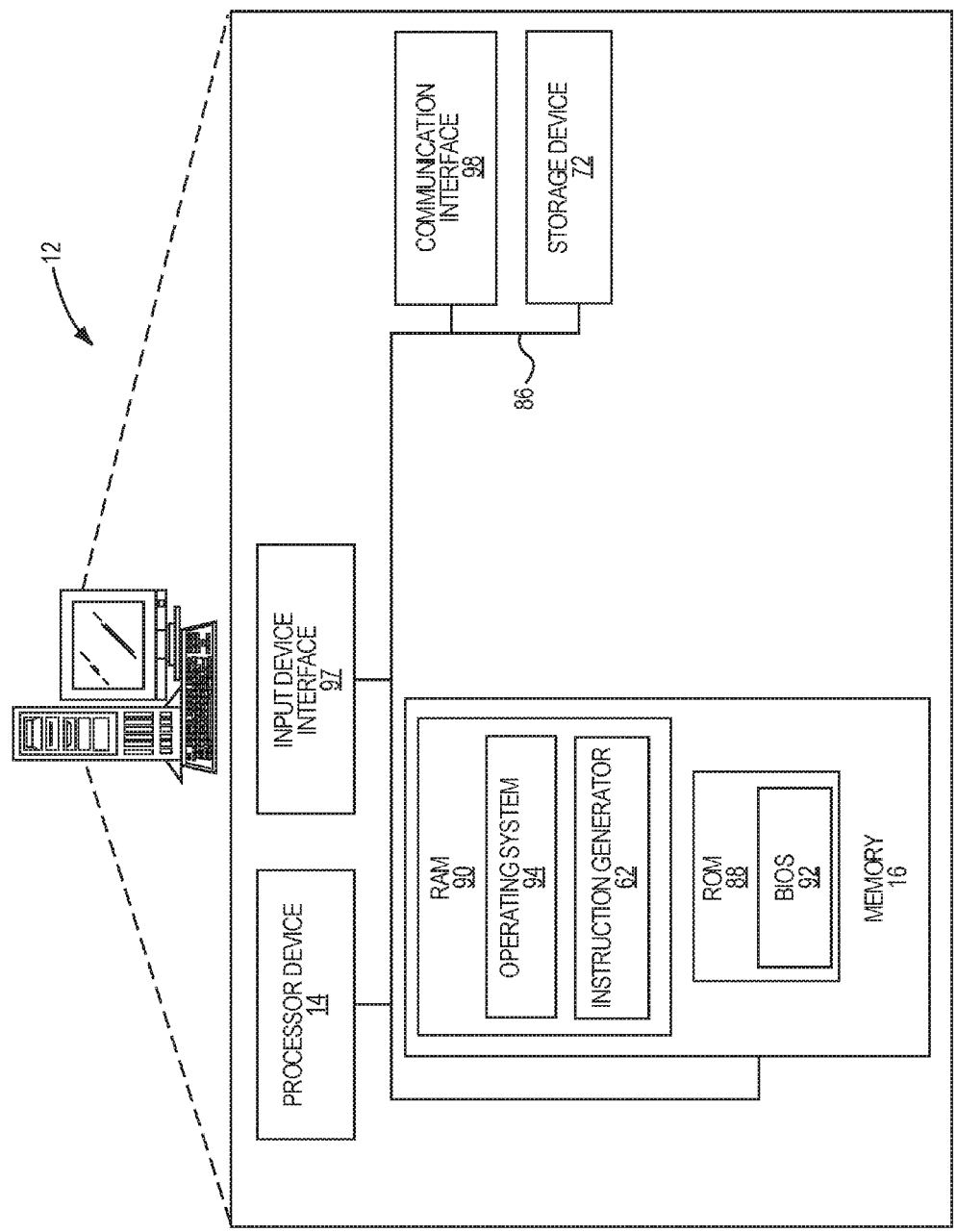
FIG. 5 is a block diagram of a computing device suitable for implementing examples according to one example.

FIG. 5 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 14, the memory 16, and a system bus 86. The system bus 86 provides an interface for system components including, but not limited to, the memory 16 and the processor device 14. The processor device 14 can be any commercially available or proprietary processor.

The system bus 86 may be any of several types of bus structures that may further interconnect to a memory bus (with or without a memory controller), a peripheral bus, and/or a local bus using any of a variety of commercially available bus architectures. The memory 16 may include non-volatile memory 88 (e.g., read-only memory (ROM), erasable programmable read-only memory (EPROM), electrically erasable programmable read-only memory (EEPROM), etc.), and volatile memory 90 (e.g., random-access memory (RAM)). A basic input/output system (BIOS) 92 may be stored in the non-volatile memory 88 and can include the basic routines that help to transfer information between elements within the computing device 12. The volatile memory 90 may also include a high-speed RAM, such as static RAM, for caching data.

The computing device 12 may further include or be coupled to a non-transitory computer-readable storage medium such as the storage device 72, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 72 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of components can be stored in the storage device 72 and in the volatile memory 90, including an operating system 94 and the instruction generator 62, which may implement the functionality described herein in whole or in part. It is to be appreciated that the examples can be implemented with various commercially available operating systems 94 or combinations of operating systems 94.

A number of modules can be stored in the storage device 72 and in the volatile memory 90, including, by way of non-limiting example, the instruction generator 62. All or a portion of the examples may be implemented as a computer program product stored on a transitory or non-transitory computer-usable or computer-readable storage medium, such as the storage device 72, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the instruction generator 62 in the volatile memory 90, may serve as a controller, or control system, for the computing device 12 that is to implement the functionality described herein.

An operator may also be able to enter one or more configuration commands through a keyboard (not illustrated), a pointing device such as a mouse (not illustrated), or a touch-sensitive surface such as a touch-sensitive display device. Such input devices may be connected to the processor device 14 through an input device interface 97 that is coupled to the system bus 86 but can be connected by other interfaces such as a parallel port, an Institute of Electrical and Electronic Engineers (IEEE) 1394 serial port, a Universal Serial Bus (USB) port, an IR interface, and the like.

The computing device 12 may also include a communication interface 98 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method for generating instructions for packet creation, comprising:
   accessing, by a computing device comprising a processor device, a packet capture comprising a plurality of packets;
   selecting, by the computing device, a first subset of packets from the plurality of packets based on a first computing device identifier (ID);
   identifying, by the computing device, based on a particular protocol layer of a plurality of protocol layers, a protocol layer characteristic of packets in the first subset of packets; and
   generating, by the computing device, a plurality of instructions that direct a packet generator component to generate a second subset of packets that have the same protocol layer characteristic as the packets in the first subset of packets.

2. The method of claim 1 wherein selecting the first subset of packets further comprises selecting the first subset of packets from the plurality of packets based on the first computing device ID that identifies a source computing device and, based on a second computing device ID, that identifies a destination computing device.

3. The method of claim 1 wherein the first computing device ID comprises an internet protocol (IP) address and a port number.

4. The method of claim 1 wherein the particular protocol layer comprises a Transmission Control Protocol (TCP) layer, and wherein the protocol layer characteristic comprises an inter-packet timing of packets communicated by the first computing device ID; and
   wherein generating the plurality of instructions that direct the packet generator component to generate the second subset of packets comprises:
   generating the plurality of instructions that direct the packet generator component to generate the second subset of packets and transmit the packets in the second subset of packets at a same inter-packet timing as the inter-packet timing of the packets in the first subset of packets.

5. The method of claim 1 wherein the protocol layer characteristic comprises a payload size, and wherein a plurality of first payload packets in the first subset of packets each include payload data unrelated to network protocol processing, each payload data having a payload data size, and wherein generating the plurality of instructions that direct the packet generator component to generate the second subset of packets comprises:
   generating a plurality of instructions that direct the packet generator component to generate the second subset of packets to include a plurality of second payload packets that correspond to the plurality of first payload packets, each second payload packet having a same payload data size as a corresponding first payload packet but having different payload data than the corresponding first payload packet.

6. The method of claim 1 wherein the particular protocol layer comprises a TCP layer and the protocol layer characteristic comprises TCP flag values comprising one or more of a push (PSH) flag value, a synchronize (SYN) flag value, an acknowledgment (ACK) flag value, a finished (FIN) flag value, an explicit congestion notification (ECN) flag value, a congestion window reduced (CWR) flag value, an urgent (URG) flag value, and a reset (RST) flag value, and wherein generating the plurality of instructions that direct the packet generator component to generate the second subset of packets further comprises:

generating a plurality of instructions that direct the packet generator component to generate the second subset of packets to include packets that correspond to the packets in the first subset of packets and that have the same TCP flag values as the corresponding packets in the first subset of packets.

7. The method of claim 1 further comprising initiating the packet generator component to generate the second subset of packets based on the plurality of instructions and to initiate transmission of the second subset of packets.

8. The method of claim 1 further comprising storing the plurality of instructions on a storage device.

9. The method of claim 1 wherein generating the plurality of instructions that direct the packet generator component to generate the second subset of packets further comprises:
identifying a syntax structure from a plurality of syntax structures;
accessing the syntax structure; and
generating the plurality of instructions based on the syntax structure.

10. The method of claim 9 wherein identifying the syntax structure from the plurality of syntax structures comprises identifying the syntax structure from the plurality of syntax structures based on the particular protocol layer.

11. A computing device comprising:
a memory;
a processor device coupled to the memory to:
access a packet capture comprising a plurality of packets;
select a first subset of packets from the plurality of packets based on a first computing device identifier (ID);
identify, based on a particular protocol layer of a plurality of protocol layers, a protocol layer characteristic of packets in the first subset of packets; and
generate a plurality of instructions that direct a packet generator component to generate a second subset of packets that have the same protocol layer characteristic as the packets in the first subset of packets.

12. The computing device of claim 11 wherein to select the first subset of packets from the plurality of packets, the processor device is further to select the first subset of packets from the plurality of packets based on the first computing device ID that identifies a source computing device and, based on a second computing device ID, that identifies a destination computing device.

13. The computing device of claim 11 wherein the particular protocol layer comprises a Transmission Control Protocol (TCP) layer, and wherein the protocol layer characteristic comprises an inter-packet timing of packets communicated by the first computing device ID; and
wherein to generate the plurality of instructions that direct the packet generator component to generate the second subset of packets, the processor device is further to:
generate the plurality of instructions that direct the packet generator component to generate the second subset of packets and transmit the packets in the second subset of packets at a same inter-packet timing as the inter-packet timing of the packets in the first subset of packets.

14. The computing device of claim 11 wherein the protocol layer characteristic comprises a payload size, and wherein a plurality of first payload packets in the first subset of packets each include payload data unrelated to network protocol processing, each payload data having a payload data size, and wherein to generate the plurality of instructions that direct the packet generator component to generate the second subset of packets, the processor device is further to:
generate a plurality of instructions that direct the packet generator component to generate the second subset of packets to include a plurality of second payload packets that correspond to the plurality of first payload packets, each second payload packet having a same payload data size as a corresponding first payload packet but having different payload data than the corresponding first payload packet.

15. The computing device of claim 11 wherein the particular protocol layer comprises a TCP layer and the protocol layer characteristic comprises TCP flag values comprising one or more of a push (PSH) flag value, a synchronize (SYN) flag value, an acknowledgment (ACK) flag value, a finished (FIN) flag value, an explicit congestion notification (ECN) flag value, a congestion window reduced (CWR) flag value, an urgent (URG) flag value, and a reset (RST) flag value, and wherein to generate the plurality of instructions that direct the packet generator component to generate the second subset of packets, the processor device is further to:
generate a plurality of instructions that direct the packet generator component to generate the second subset of packets to include packets that correspond to the packets in the first subset of packets and that have the same TCP flag values as the corresponding packets in the first subset of packets.

16. The computing device of claim 11 wherein to generate the plurality of instructions that direct the packet generator component to generate the second subset of packets, the processor device is further to:
identify a syntax structure from a plurality of syntax structures;
access the syntax structure; and
generate the plurality of instructions based on the syntax structure.

17. A computer program product for generating instructions for packet creation, the computer program product stored on a non-transitory computer-readable storage medium and including program instructions to cause a processor device to:
access a packet capture comprising a plurality of packets;
select a first subset of packets from the plurality of packets based on a first computing device identifier (ID);
identify, based on a particular protocol layer of a plurality of protocol layers, a protocol layer characteristic of packets in the first subset of packets; and
generate a plurality of instructions that direct a packet generator component to generate a second subset of packets that have the same protocol layer characteristic as the packets in the first subset of packets.

18. The computer program product of claim 17 wherein the particular protocol layer comprises a Transmission Control Protocol (TCP) layer, and wherein the protocol layer characteristic comprises an inter-packet timing of packets communicated by the first computing device ID; and
wherein to generate the plurality of instructions that direct the packet generator component to generate the second subset of packets, the program instructions further cause the processor device to:
generate the plurality of instructions that direct the packet generator component to generate the second subset of packets and transmit the packets in the second subset of packets at a same inter-packet timing as the inter-packet timing of the packets in the first subset of packets.

19. The computer program product of claim 17 wherein the protocol layer characteristic comprises a payload size, and wherein a plurality of first payload packets in the first subset of packets each include payload data unrelated to network protocol processing, each payload data having a payload data size, and wherein to generate the plurality of instructions that direct the packet generator component to generate the second subset of packets, the program instructions further cause the processor device to:
generate a plurality of instructions that direct the packet generator component to generate the second subset of packets to include a plurality of second payload packets that correspond to the plurality of first payload packets, each second payload packet having a same payload data size as a corresponding first payload packet but having different payload data than the corresponding first payload packet.

20. The computer program product of claim 17 wherein the particular protocol layer comprises a TCP layer and the protocol layer characteristic comprises TCP flag values comprising one or more of a push (PSH) flag value, a synchronize (SYN) flag value, an acknowledgment (ACK) flag value, a finished (FIN) flag value, an explicit congestion notification (ECN) flag value, a congestion window reduced (CWR) flag value, an urgent (URG) flag value, and a reset (RST) flag value, and wherein to generate the plurality of instructions that direct the packet generator component to generate the second subset of packets, the program instructions further cause the processor device to:
generate a plurality of instructions that direct the packet generator component to generate the second subset of packets to include packets that correspond to the packets in the first subset of packets and that have the same TCP flag values as the corresponding packets in the first subset of packets.

21. A method for generating instructions for packet creation, comprising:
accessing, by a computing device comprising a processor device, a packet capture comprising a plurality of packets;
selecting a first subset of packets from the plurality of packets based on a first computing device identifier (ID);
identifying, based on a particular protocol layer of a plurality of protocol layers, a protocol layer characteristic of packets in the first subset of packets, the protocol layer characteristic comprising one of:
a window scaling factor;
a window size;
one or more Boolean flags;
a frame timing; and/or
an inter-packet timing; and
generating a plurality of instructions that direct a packet generator component to generate a second subset of packets that have the same protocol layer characteristic as the packets in the first subset of packets and to initiate transmission of the second subset of packets.

* * * * *